United States Patent
Jackson et al.

(10) Patent No.: US 8,714,206 B2
(45) Date of Patent: May 6, 2014

(54) STYRENIC INSULATION FOR PIPE

(75) Inventors: Peter Jackson, Toronto (CA); Adam Jackson, Trondheim (NO)

(73) Assignee: Shawcor Ltd., Toronto (CA)

( * ) Notice: Subject to any disclaimer, the term of this patent is extended or adjusted under 35 U.S.C. 154(b) by 1655 days.

(21) Appl. No.: 11/962,772

(22) Filed: Dec. 21, 2007

(65) Prior Publication Data

US 2009/0159146 A1 Jun. 25, 2009

(51) Int. Cl.
*F16L 9/14* (2006.01)

(52) U.S. Cl.
USPC ............ 138/149; 138/137; 138/141; 138/146

(58) Field of Classification Search
USPC .......... 138/109, 137, 140, 141, 146, 149, 155
See application file for complete search history.

(56) References Cited

U.S. PATENT DOCUMENTS

| | | | |
|---|---|---|---|
| 2,797,731 A | 7/1957 | Carlson, Jr. | |
| 3,477,891 A | 11/1969 | Hawerkamp | |
| 3,607,492 A * | 9/1971 | Keith et al. | 156/79 |
| 3,731,710 A | 5/1973 | Bauer et al. | |
| 3,916,953 A | 11/1975 | Nagayoshi et al. | |
| 3,929,166 A | 12/1975 | Westerheid | |
| 3,967,020 A * | 6/1976 | Uemura et al. | 428/35.8 |
| 3,979,818 A * | 9/1976 | Groch et al. | 29/455.1 |
| 4,098,941 A * | 7/1978 | Johnson | 428/218 |
| 4,162,093 A | 7/1979 | Sigmund | |
| 4,310,585 A * | 1/1982 | Shannon | 428/218 |
| 4,377,186 A | 3/1983 | Genini et al. | |
| 4,485,057 A | 11/1984 | Kristensson et al. | |
| 4,523,141 A | 6/1985 | Thomas et al. | |
| 4,549,581 A | 10/1985 | Unno et al. | |
| 4,589,275 A | 5/1986 | Thomas et al. | |
| 4,590,108 A | 5/1986 | Nippe | |
| 4,590,971 A | 5/1986 | Webster et al. | |
| 4,640,312 A | 2/1987 | Patell et al. | |
| 4,657,050 A | 4/1987 | Patterson | |
| 4,676,695 A | 6/1987 | Duthweiler | |
| 4,713,271 A | 12/1987 | Searl et al. | |
| 4,913,588 A | 4/1990 | Vilnes | |
| 5,026,451 A | 6/1991 | Trzecieski et al. | |
| 5,160,769 A | 11/1992 | Garrett | |

(Continued)

FOREIGN PATENT DOCUMENTS

| | | |
|---|---|---|
| CA | 950818 | 7/1974 |
| CA | 1333653 | 12/1994 |

(Continued)

OTHER PUBLICATIONS

Therma-Coat, Therma-Coat Acrylic Insulating Primer Product Overview & Technical Specification, Web page, http://www.therma-coat.com/therma-coat-technical/therma-coat-technical-specification.pdf.

*Primary Examiner* — Christopher Kim
(74) *Attorney, Agent, or Firm* — DeLio, Peterson & Curcio, LLC; Peter W. Peterson

(57) ABSTRACT

Coatings for protecting and insulating fluid and/or gas transport conduits, such as off-shore oil and gas pipelines operating at temperatures of up to 100° C. in water depths above 1,000 meters. The outer surface of the conduit is provided with at least one layer of thermal insulation comprising polystyrene or styrene-based thermoplastic, having low thermal conductivity, high thermal softening point, high compressive strength and high compressive creep resistance.

29 Claims, 3 Drawing Sheets

(56) References Cited

U.S. PATENT DOCUMENTS

| | | |
|---|---|---|
| 5,238,615 A | 8/1993 | Stoor |
| 5,590,691 A * | 1/1997 | Iorio et al. ............. 138/146 |
| 5,597,522 A | 1/1997 | Curzon et al. |
| 5,869,591 A | 2/1999 | McKay et al. |
| 5,934,335 A | 8/1999 | Hardy |
| 5,996,643 A | 12/1999 | Stonitsch |
| 6,019,137 A | 2/2000 | Secher et al. |
| 6,058,979 A | 5/2000 | Watkins |
| 6,065,781 A | 5/2000 | Titus |
| 6,092,557 A | 7/2000 | Sumner |
| 6,142,707 A | 11/2000 | Bass et al. |
| 6,145,546 A | 11/2000 | Hardy et al. |
| 6,199,595 B1 | 3/2001 | Baker |
| 6,235,806 B1 | 5/2001 | Ohga et al. |
| 6,264,401 B1 | 7/2001 | Langner et al. |
| 6,264,871 B1 | 7/2001 | Mullen et al. |
| 6,283,215 B1 | 9/2001 | Kohler et al. |
| 6,382,259 B1 | 5/2002 | Codling |
| 6,397,895 B1 | 6/2002 | Lively |
| 6,505,650 B2 | 1/2003 | Bohon et al. |
| 6,527,015 B2 * | 3/2003 | Lively ................. 138/149 |
| 6,668,866 B2 | 12/2003 | Glejbol et al. |
| 6,706,350 B2 * | 3/2004 | Sato et al. ............. 428/36.9 |
| 6,706,776 B2 * | 3/2004 | Markusch et al. ......... 521/170 |
| 6,736,430 B1 | 5/2004 | Meulemans et al. |
| 6,739,803 B2 | 5/2004 | Bass et al. |
| 6,814,146 B2 | 11/2004 | Bass et al. |
| 6,827,110 B2 | 12/2004 | Watkins |
| 6,843,950 B1 | 1/2005 | Mally et al. |
| 6,887,938 B2 | 5/2005 | Atkinson |
| 6,926,040 B1 | 8/2005 | Prescott et al. |
| 6,978,807 B1 | 12/2005 | Keyes |
| 7,069,955 B2 | 7/2006 | Glejbol et al. |
| 7,101,607 B2 | 9/2006 | Mollendorf et al. |
| 7,302,973 B2 | 12/2007 | Glejbol et al. |
| 7,311,123 B2 | 12/2007 | Espinasse et al. |
| 7,344,161 B2 | 3/2008 | Howard et al. |
| 2002/0083993 A1 | 7/2002 | Bohon et al. |
| 2003/0060525 A1 | 3/2003 | Gupta |
| 2003/0075226 A1 | 4/2003 | Codling et al. |
| 2003/0207103 A1 * | 11/2003 | Zvosec et al. ............ 428/329 |
| 2003/0213525 A1 * | 11/2003 | Patel et al. ............. 138/149 |
| 2004/0076478 A1 | 4/2004 | Legras et al. |
| 2004/0231743 A1 | 11/2004 | Keyes |
| 2005/0038226 A1 | 2/2005 | Ratzsch et al. |
| 2005/0095380 A1 | 5/2005 | Watkins et al. |
| 2005/0214547 A1 | 9/2005 | Pasquier et al. |
| 2006/0016617 A1 | 1/2006 | Corbishley |
| 2006/0108016 A1 | 5/2006 | Funatsu et al. |
| 2006/0131027 A1 | 6/2006 | Chiesa et al. |
| 2008/0079260 A1 | 4/2008 | Duncan |
| 2008/0128043 A1 | 6/2008 | Watkins |
| 2008/0136169 A1 | 6/2008 | Duncan |

FOREIGN PATENT DOCUMENTS

| | | |
|---|---|---|
| CA | 2152150 | 12/1995 |
| CA | 2377767 | 1/2001 |
| CA | 2356451 | 2/2003 |
| CA | 2454541 | 11/2004 |
| CA | 2610202 | 12/2006 |
| CA | 2617156 | 2/2007 |
| CA | 2555756 | 2/2008 |
| EP | 0431000 B1 | 4/1994 |
| EP | 0615596 B1 | 8/1996 |
| EP | 0521582 | 9/1996 |
| EP | 0704036 B1 | 1/1998 |
| EP | 0619343 | 8/1998 |
| EP | 1301343 | 4/2004 |
| EP | 1649205 | 4/2004 |
| EP | 1690662 A1 | 8/2006 |
| GB | 1368665 | 10/1974 |
| GB | 1450012 | 9/1976 |
| GB | 2001664 A | 2/1979 |
| GB | 1547113 | 6/1979 |
| GB | 1590782 | 6/1981 |
| GB | 2215427 A | 9/1989 |
| GB | 2296749 A | 7/1996 |
| GB | 2306127 A | 4/1997 |
| GB | 2365096 A | 2/2002 |
| GB | 2401921 A | 11/2004 |
| JP | 03194289 | 8/1991 |
| WO | WO8704768 | 8/1987 |
| WO | WO8808500 | 11/1988 |
| WO | WO8911618 | 11/1989 |
| WO | WO9319927 | 10/1993 |
| WO | WO9420274 | 9/1994 |
| WO | WO9515461 | 6/1995 |
| WO | WO9533953 | 12/1995 |
| WO | WO9607846 | 3/1996 |
| WO | WO9710936 | 3/1997 |
| WO | WO9748941 | 12/1997 |
| WO | WO0073694 | 12/2000 |
| WO | WO0073695 | 12/2000 |
| WO | WO0102503 | 1/2001 |
| WO | WO0150055 | 7/2001 |
| WO | WO0159348 | 8/2001 |
| WO | WO0212776 | 2/2002 |
| WO | WO2005010894 | 2/2005 |
| WO | WO2005025830 | 3/2005 |
| WO | WO2006134077 | 12/2006 |
| WO | 2007090265 A1 | 8/2007 |
| WO | WO2008017147 | 2/2008 |

\* cited by examiner

STYRENIC INSULATION FOR PIPE

FIELD OF THE INVENTION

The present invention relates to polymeric coatings for insulating and protecting fluid and/or gas transport conduits, transport conduits insulated with these insulating coatings, and methods for the production and application thereof. More particularly, the insulating and protective coatings according to the invention comprise at least one layer of a styrene-based polymer having low thermal conductivity and high compressive creep resistance and are cost effective for use in the thermal insulation of fluid and/or gas transport conduits such as oil and gas pipelines.

BACKGROUND OF THE INVENTION

There is increasing demand in the oil and gas industry for higher performance thermal coatings to insulate and protect off-shore transport conduits operating at high temperatures in water depths above 1,000 meters. In order to maintain the conduit at the required operating temperatures at these depths, the coatings must have low thermal conductivity to prevent the formation of hydrates and waxes that would compromise pumping efficiency of the fluid in the conduit. Thermal conductivity is decreased through foaming the coating to some required degree, but the coating must maintain high enough thermal stability and compressive creep resistance to withstand the operating temperatures and hydrostatic pressures acting on the coating in deep water. Without sufficient compressive strength, the insulation will be compressed in thickness, thereby increasing thermal conductivity and altering the dimensions and the thermal and hydrodynamic performance of the system. Also, it is important that the coating remain sufficiently ductile after application on the conduit to prevent cracking during handling and installation, for example during reeling of the conduit onto a lay barge and subsequent deployment therefrom.

Multi-phase fluid flow is common in subsea fluid transport conduits, such as flowlines and risers. Two main concerns in such systems are the formation of gas-water hydrates and the deposition of wax. Both of these phenomena are related to the temperature of the fluid, and in extreme cases the conduit can become severely constricted or even blocked. This in turn can lead to reduced or lost production. In particularly serious cases this may lead to the need to replace sections of pipeline or entire systems with corresponding loss of asset value. Thermal insulation is used to provide controlled energy loss from the system either in steady state condition or in the case of planned and un-planned stoppage and thereby provide a reliable basis for operation.

For single-pipe flowlines and risers, using bonded external insulation, the mechanical loads as well as the requirements placed on the mechanical and thermal performance of thermal insulation systems normally increase with deeper waters. Hence, the traditional thermal insulation foam technology used in shallow waters and the associated design and test methodology may not be applicable to deep-water projects.

Current technologies include single pipe solutions, typically with insulation requirements in the heat transfer coefficient range of 3-5 $W/m^2$ K, using polypropylene foam or polyurethane foam as the insulant, and so-called Pipe-In-Pipe systems wherein a second pipe surrounds the primary conduit, the annulus between the two pipes being filled with an insulating material.

Limitations and deficiencies of these technologies include:
Relatively high thermal conductivity of foamed polypropylene systems necessitating excessively thick coatings to achieve the required insulation performance, leading to potential difficulties in foam processing, potential issues with residual stress, difficulties during pipe deployment, and sea-bed instability.
Compression and creep resistance issues at high water depth leading to a change in buoyancy posing significant challenges in system design.
Excessive costs due to poor material cost versus performance capabilities or high transportation and deployment costs.
Deployment and operation disadvantages with Pipe-In-Pipe systems due to weight factors leading to buckling and weld failure if not properly addressed, and the need for high gripping loads during pipe laying.

Therefore, there remains a need for improved coatings for thermal insulation and protection of fluid and/or gas transport conduits such as oil and gas pipelines, especially for off-shore transport conduits operating at high temperatures in water depths above 1,000 meters.

SUMMARY OF THE INVENTION

This invention overcomes the above-mentioned deficiencies through the use of thermally insulating and protective coatings having superior thermal insulation capabilities while maintaining the mechanical properties required for subsea applications, resulting in lower coating thicknesses and costs to achieve acceptable system performance.

In one aspect, the present invention provides insulating and protective coatings comprising at least one thermal insulation layer of a polystyrene or styrene-based thermoplastic, containing gas bubbles, and having the desired properties of low thermal conductivity, high thermal stability and high compressive strength at elevated temperatures and pressures.

In another aspect, the present invention provides insulating and protective coatings comprising at least one thermal insulation layer of a polystyrene or styrene-based thermoplastic, containing hollow polymer, glass or ceramic micro-spheres, and having the desired properties of low thermal conductivity, high thermal stability and high compressive strength at elevated temperatures and pressures.

In yet another aspect, the present invention provides insulating and protective coatings comprising at least one thermal insulation layer of unfoamed polystyrene or styrene-based thermoplastic, and having the desired properties of low thermal conductivity, high thermal stability and high compressive strength at elevated temperatures and pressures.

In yet another aspect, the present invention provides insulating and protective coatings comprising at least one layer of foamed or solid (unfoamed) polystyrene or styrene-based thermoplastic, and at least one other layer of a dissimilar polymeric material, and having the desired properties of low thermal conductivity, high thermal stability and high compressive strength at elevated temperatures and pressures.

In yet another aspect, the present invention provides a method of manufacturing and applying said insulating and protective coatings whereby at least one layer of polystyrene or styrene-based thermoplastic, is extruded, optionally foamed, and applied as a thermal insulation layer, or layers, to the exterior of a steel pipe.

In yet another aspect, the present invention provides an insulated fluid and/or gas transport conduit, such as a high-temperature oil and gas pipeline for use in subsea environments, the pipeline comprising: (a) a continuous steel pipe made up of one or more pipe sections, wherein the steel pipe has an outer surface and an inner surface; (b) a corrosion protection system comprising an epoxy coating bonded directly to the surface of the steel pipe and additional adhesive and topcoat as required; and (b) at least one layer of thermal insulation applied over the corrosion protection system, wherein at least one layer of said thermal insulation is comprised of a polystyrene or styrene-based thermoplastic, having low thermal conductivity, high thermal stability, high compressive strength and high compressive creep resistance, and which is optionally foamed.

In a further aspect, the present invention provides a thermoplastic pipe joint protection and insulation system, comprised of a polystyrene or styrene-based thermoplastic, compatible with, and bondable to, the above mentioned insulating and protective coatings comprising at least one layer of polystyrene or styrene-based thermoplastic.

BRIEF DESCRIPTION OF THE DRAWINGS

The invention will now be described, by way of example only, with reference to the accompanying drawings in which.

DETAILED DESCRIPTION OF PREFERRED EMBODIMENTS

Figure 1:
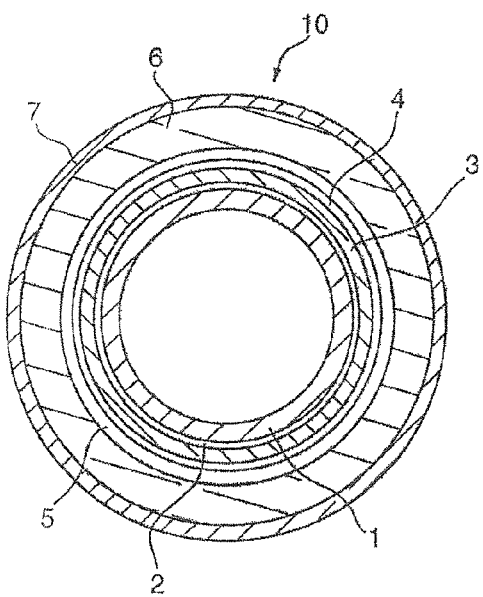
FIG. 1 is a transverse cross-section of an insulated pipeline according to a first embodiment of the invention.

The present invention relates to insulating and protective coatings and thermally insulated fluid and/or gas transport conduits incorporating said coatings for use in subsea environments. The present invention also relates to methods of manufacturing said insulating and protective coatings and for manufacturing thermally insulated high-temperature fluid and/or gas transport conduits incorporating said coatings.

The fluid and/or gas transport conduits described below are oil and gas pipelines which are typically made up of one or more steel pipe sections. The term "fluid and/or gas transport conduits", and similar terms as used herein, are intended to include such oil and gas pipelines and related components, including flowlines, risers, jumpers, spools, manifolds and ancillary equipment.

A major consideration in the use of steel pipe is protection of the pipe from long-term corrosion in humid and high-temperature service conditions. Therefore the insulating and protective coatings according to the invention may comprise one or more corrosion-protection layers or a multi-layer corrosion protection system which is applied over the blasted and cleaned steel pipe prior to the application of any subsequent layers, including the at least one layer of polystyrene or styrene-based thermoplastic according to the invention. For example, the corrosion protection layer may comprise a cured epoxy layer directly applied to the outer surface of the steel pipe and bonded thereto.

It will be appreciated that layers making up the insulating and protective coatings described below are not shown to scale in the drawings. In particular, the thicknesses of some of the layers making up the coatings are exaggerated in relation to the thicknesses of the other layers and also relative to the thickness and diameter of the steel pipe.

FIG. 1 illustrates a transverse cross-section of an insulated oil and gas pipeline 10 according to a first embodiment of the invention. The insulated pipeline 10 includes one or more sections of steel pipe 1 in which the insulating and protective coating includes a three-layer corrosion protection system. According to this system, the steel pipe 1 is coated with a corrosion protection layer 2 comprised of cured epoxy, an intermediate first adhesive layer 3 applied over the corrosion protection layer 2, and a first protective topcoat 4 applied over the first adhesive layer 3. The first protective topcoat 4 provides added corrosion and mechanical protection and the adhesive layer 3 provides an adhesive bond between the topcoat 4 and the underlying corrosion protection layer 2. The topcoat 4 is shown in FIG. 1 as a thin layer between the adhesive layer 3 and the overlying insulation layers described below. The composition and thickness of the topcoat 4 will at least partially depend on the compositions of the underlying adhesive layer 3 and the overlying insulation layers, particularly with respect to adhesion to those layers. In terms of composition, the topcoat may preferably comprise an extrudable thermoplastic resin which may comprise the same material as an overlying thermal insulation layer, or a material compatible with or bondable to the thermal insulation layer, including a blend of two or more materials.

Figure 2:
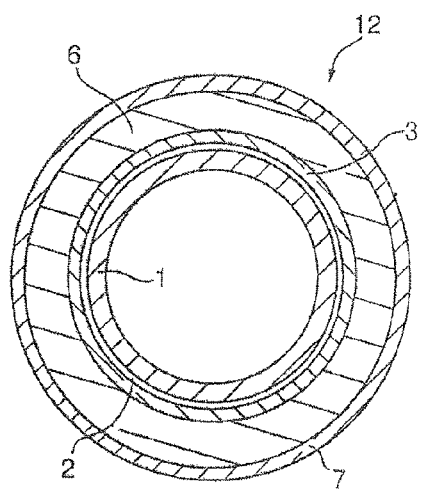
FIG. 2 is a transverse cross-section of an insulated pipeline according to a second embodiment of the invention.

FIG. 2 illustrates a transverse cross-section of an insulated oil and gas pipeline 12 according to a second embodiment of the invention. The insulated pipeline 12 includes one or more sections of steel pipe 1 provided with a two-layer corrosion protection system, wherein the steel pipe 1 is provided with a corrosion protection layer 2 comprised of cured epoxy and a first adhesive layer 3 applied over layer 2, as in FIG. 1. In the corrosion protection system shown in FIG. 2 the first adhesive layer 3 doubles as both adhesive and topcoat, thereby eliminating the need for the separate application of a first protective topcoat 4. A similar two-layer corrosion protection system is shown in FIG. 4 which illustrates a transverse cross-section of an insulated oil and gas pipeline 16 according to a fourth embodiment of the invention.

Figure 3:
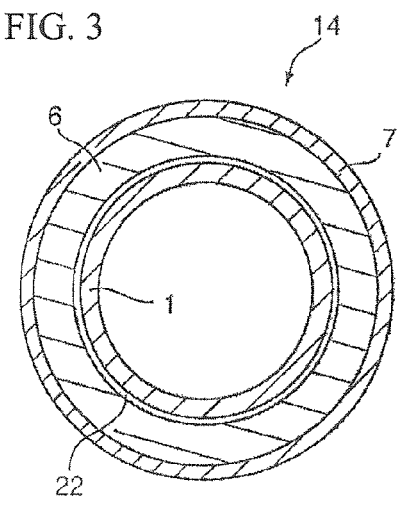
FIG. 3 is a transverse cross-section of an insulated pipeline according to a third embodiment of the invention.
Figure 4:
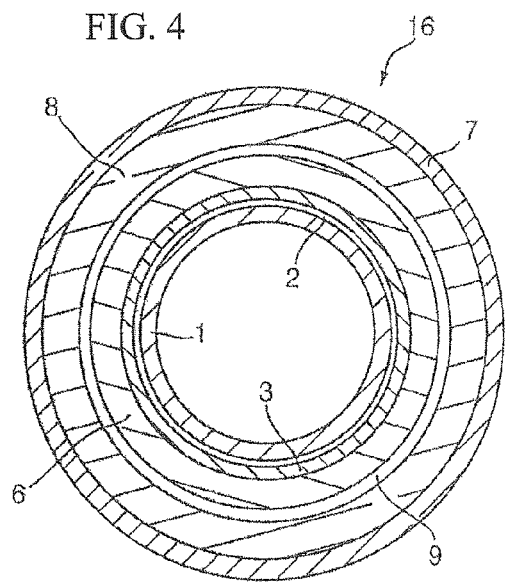
FIG. 4 is a transverse cross-section of an insulated pipeline according to a fourth embodiment of the invention.

As an alternative to the multi-layer corrosion protection systems illustrated in FIGS. 1, 2 and 4, the steel pipe 1 may instead be provided with a single-layer composite corrosion protection layer wherein the epoxy, adhesive and polymer topcoat components are pre-mixed and applied onto the pipe 1 as a variably graded coating. FIG. 3 illustrates a transverse cross-section of an insulated oil and gas pipeline 14 according to a third embodiment of the invention. The insulated pipeline 14 includes one or more sections of steel pipe 1 provided with such a single-layer composite corrosion protection coating 22.

In the insulated oil and gas pipelines according to the invention, the insulating and protective coatings also comprise one or more thermal insulation layers, which include one or more foamed layers and/or one or more unfoamed (solid) layers. The pipelines 10, 12 and 14 illustrated in FIGS. 1 to 3 include a single thermal insulation layer 6, whereas the pipeline 16 of FIG. 4 is provided with first (inner) and second (outer) thermal insulation layers 6 and 8. It will also be appreciated that insulated oil and gas pipelines according to the invention may comprise more than two layers of thermal insulation, each of which may be foamed or unfoamed.

Where the insulated pipeline includes a single corrosion protection layer or a multi-layer corrosion protection system, the thermal insulation layer 6 must firmly adhere to said corrosion protection layer or system. This is a particularly important consideration if the thermal insulation layer 6 and the underlying corrosion protection layer or system are comprised of dissimilar polymeric materials. Adhesion between the layers, also known as interlayer adhesion, is also dependent upon the coating temperature and the mode of application of the layers. For example, it may be necessary to preheat the corrosion protection layer or system prior to the application of the overlying thermal insulation layer 6 to better fuse the two layers together and maximize interlayer adhesion. It may also be necessary to apply an adhesive layer between the corrosion protection layer or system and the thermal insulation layer 6. This is illustrated, for example, in FIG. 1, in which a second adhesive layer 5 is applied between the thermal insulation layer 6 and the underlying protective topcoat 4 of the three-layer corrosion protection system, and serves to bond the thermal insulation layer 6 to the topcoat 4. In the embodiments of FIGS. 2 and 4, the first adhesive layer 3 serves as both an adhesive and a protective topcoat and bonds the thermal insulation layer 6 to the corrosion protection layer 2. In the embodiment of FIG. 3, the thermal insulation layer 6 is directly bonded to the corrosion protective layer 2 without the aid of an adhesive layer.

Where either of the thermal insulation layers 6, 8 are foamed, an additional consideration is the effect of interlayer adhesion on foam integrity, since any collapse of the foam structure at the interface due to application heat and pressure to effect adhesion will compromise the overall thermal insulation performance of the system.

As shown in FIGS. 1 to 5, an outer protective topcoat 7 may be applied over the outer layer of insulation to provide further resistance to static pressure at great depths, particularly if said outer layer of insulation is foamed. The outer protective topcoat 7 may, for example, comprise the same polymeric material as one or more of the thermal insulation layers but is preferably in a solid, unfoamed state. For example, where the outer layer of insulation (eg. layer 6 or 8) is comprised of a foamed polystyrene or styrene-based thermoplastic, the outer protective topcoat 7 is comprised of a solid, unfoamed polystyrene or styrene-based thermoplastic.

It will be appreciated that the outer protective topcoat and the thermal insulation layers may instead be comprised of different polymeric materials, in which case it may be preferred to provide an additional layer of adhesive (not shown) between the outer layer of thermal insulation and the outer protective layer. It will also be appreciated that the protective topcoat 7 is not necessary in all embodiments of the invention, and FIGS. 6 to 9 illustrate insulated pipelines 18, 20, 24 and 26 which are identical to pipelines 10, 12, 14 and 16, respectively, with the exception that they do not include a protective topcoat 7. It will be appreciated that the outer protective topcoat may be unnecessary, for example, where the outermost thermal insulation layer is foamed but naturally forms a solid skin during processing.

As shown in FIG. 4, the insulating and protective coating may comprise more than one thermal insulation layer of the same polymer composition foamed to different degrees, or densities, or it may comprise more than one thermal insulation layer of solid or foam made from dissimilar polymer materials. This allows the system to be tailored for precise thermal insulation performance related to the end application.

For example, a polymer with higher temperature resistance or softening point such as polypropylene may be used as an inner foam or solid thermal insulation layer closest to the hot steel pipe with lower temperature resistant and lower thermal conductivity polystyrene or styrene-based thermoplastic, as an outer secondary, or tertiary, insulation layer.

Figure 5:
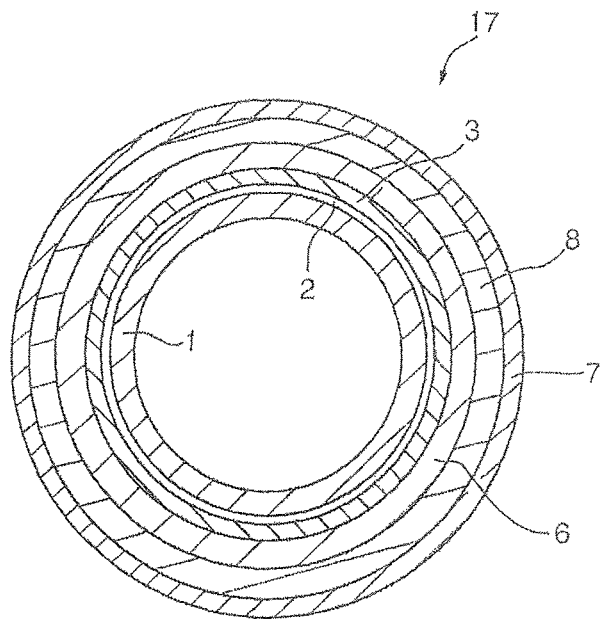
FIG. 5 is a transverse cross-section of an insulated pipeline according to a modified fourth embodiment of the invention.
Figure 10:
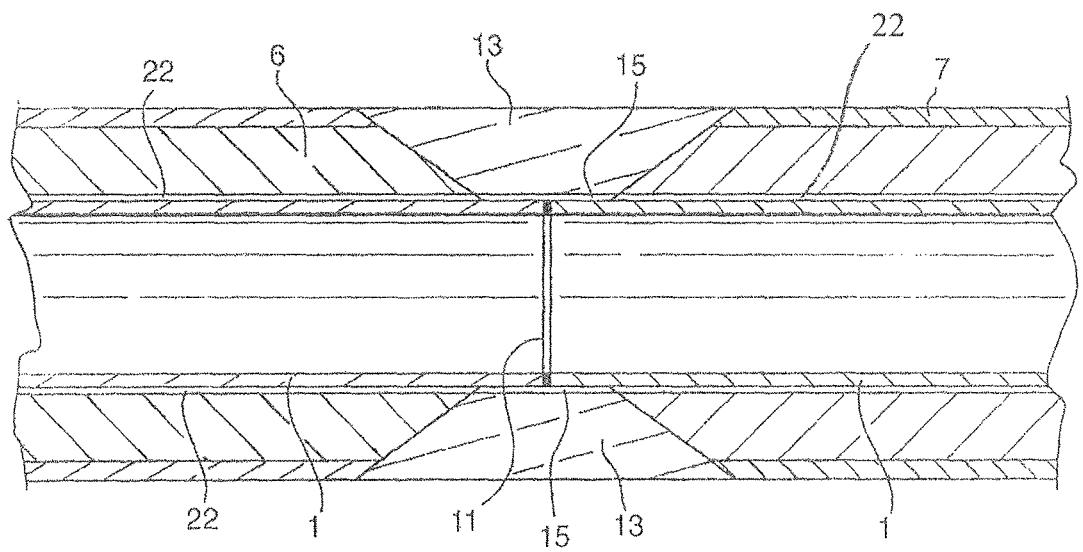
FIG. 10 is a longitudinal cross-section of the pipe joint area of 2 insulated pipelines welded together.
Figure 6:
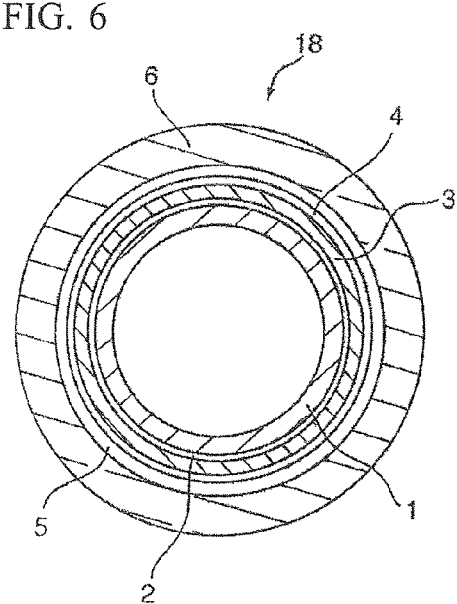
FIG. 6 is a transverse cross-section of an insulated pipeline according to a fifth embodiment of the invention.
Figure 7:
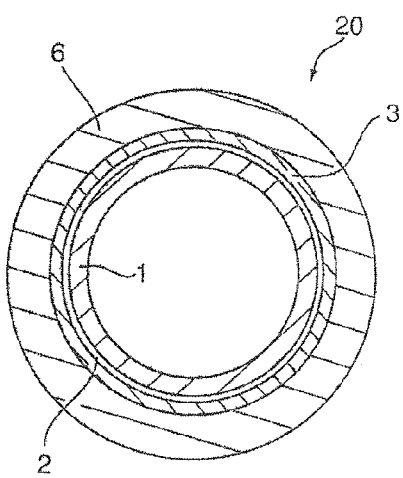
FIG. 7 is a transverse cross-section of an insulated pipeline according to a sixth embodiment of the invention.
Figure 8:
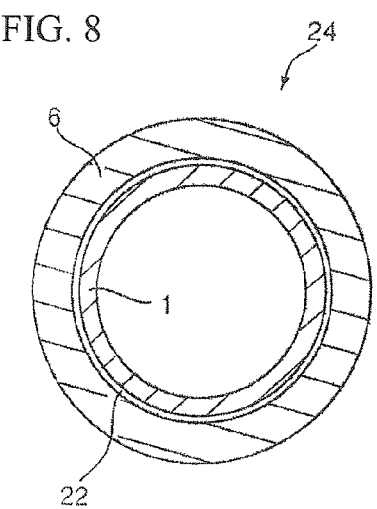
FIG. 8 is a transverse cross-section of an insulated pipeline according to a seventh embodiment of the invention.

The embodiment illustrated in FIG. 4 includes an inner foam insulation layer 6 and an outer foam insulation layer 8 which may be of the same or different composition and/or density. The foam insulation layers 6 and 8 are separated by a layer 9 of unfoamed polymeric material which may be of the same or different composition as either one or both of the layers 6 and 8. It will be appreciated that an adhesive layer may be provided between the foam layers 6, 8 or between one or more of foam layers 6, 8 and the adjacent unfoamed layer 9. It will be appreciated that the unfoamed layer 9 may not be necessary in all situations, for example where individual foam insulation layers are bonded directly to one another. This is illustrated in FIG. 5 which shows an insulated pipeline 17 identical to the pipeline 16 of FIG. 4 except for the omission of unfoamed layer 9 between foam insulation layers 6 and 8.

In another variation, the inner thermal insulation layer 6, i.e. the insulation layer closest to the steel pipe 1, may comprise a solid, unfoamed layer comprised of polypropylene, polystyrene or styrene-based thermoplastic, with subsequent outer layers of thermal insulation (eg. layer 8) being foamed. The insulation layers may also be foamed to gradually increasing degrees the further they are away from the pipe wall, i.e. outer layers of thermal insulation may preferably be foamed to a higher degree than inner layers.

Although the embodiments of the invention shown in the drawings include either one or two thermal insulation layers, it will be appreciated that insulated pipelines according to the invention may include more than two layers of foamed or unfoamed thermal insulation, with or without layers of unfoamed polymer and/or adhesive being provided between the foam layers.

It is also necessary to provide thermal insulation around the joint area where two lengths of steel pipe are welded together. This composition of this pipe joint insulation system must be compatible with, and bondable to, both the corrosion protection layer or system applied directly over the welded pipe joint and the existing thermal insulation layer, or layers, including any protective topcoats and any other layers, on the pipe.

Figure 9:
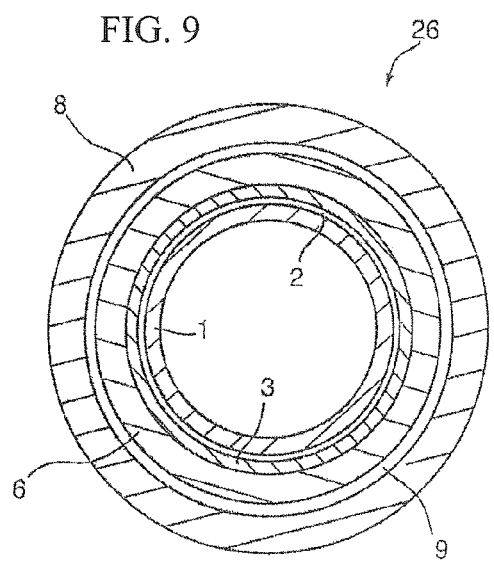
FIG. 9 is a transverse cross-section of an insulated pipeline according to an eighth embodiment of the invention.

FIG. 9 illustrates a longitudinal cross-section of a circular pipe joint weld area 11 at which two steel pipes 1 are joined. The steel pipes 1 each have an insulating and protective coating as shown in FIG. 3 comprising a corrosion protection layer 22, a thermal insulation layer 6 and an outer protective topcoat 7. It will, however, be appreciated that the pipes 1 could be provided with any of the insulating and protective coatings shown in the drawings or described herein. The pipe joint weld area 11 is provided with pipe joint insulation, 13 which is bonded to a corrosion protection system 15 comprising an epoxy inner layer and an adhesive top layer. The corrosion protection system 15 may have the same composition and thickness as any of the corrosion protection layers or systems described therein, and the pipe joint insulation layer 13 may have the same composition as any of the thermal insulation layers described herein. The pipe joint insulation system is further described below.

Composition and Application of Layers
Corrosion Protection System

As mentioned above, it may be advantageous to apply one or more corrosion protection layers or a multi-layer corrosion protection system to the steel pipe prior to any subsequent layers. The initial corrosion protection layer, namely that coating bonded directly to the steel pipe, is preferably comprised of cured epoxy which is applied onto the cleaned and pre-heated pipe surface either, a) as a fusion bonded powder by spraying the pipe with powder-spray guns, passing the pipe through a "curtain" of falling powder, or using a fluidized bed containing the powder, or, b) as a liquid coating using liquid-spray guns. Curing of the epoxy results from contact with the hot pipe.

It may also be preferred to apply additional layers over the partially cured epoxy. In the 3-layer corrosion protection system illustrated in FIG. 1, an olefin-based adhesive copolymer, for example a maleic anhydride functionalised ethylene copolymer, is preferably applied directly to the partially cured epoxy, followed by the application of a polymer topcoat over the adhesive for mechanical protection. In this example the topcoat is preferably a polystyrene homopolymer, polystyrene copolymer, or modified polystyrene, such as high-impact polystyrene, in which the polystyrene is typically modified with butadiene rubber. The function of the adhesive is to bond the topcoat to the epoxy corrosion protection layer. The adhesive and polymer topcoat are preferably applied by an extrusion side-wrap process.

Additional Adhesive Layer(s)

In cases where it is necessary to apply an adhesive layer between adjacent thermal insulation layers or between a thermal insulation layer and one or more of the other layers, including any solid protective layers and topcoats, the adhesive material used should bond equally well to said thermal insulation layer and the layer to which the thermal insulation layer is bonded. The adhesives used are typically polymers with functionalities having mutual affinity to the layers requiring bonding, the functionalities being specific to the chemical composition of the layers requiring bonding. Preferably the bond strength should be high enough to promote cohesive failure between the individual layers.

The adhesive layer between adjacent thermal insulation layers and between a thermal insulation layer and one or more of the other layers may also comprise an olefin-based adhesive copolymer, for example a maleic anhydride functionalised ethylene copolymer.

The adhesive layer is preferably applied by powder spray application, or side-wrap, crosshead extrusion or co-extrusion methods.

Thermal Insulation Layer(s)

The insulating and protective coatings according to the present invention are designed to withstand operating temperatures up to about 100° C. They are also designed to exhibit adequate compressive creep resistance and modulus at these temperatures to prevent collapse of the foam structure and hence maintain the required thermal insulation over the lifetime of the oil and gas recovery project. In addition, the compositions should be sufficiently ductile to withstand the bending strains experienced by the insulated pipe during reeling and installation operations.

The thermal insulation layers according to the present invention are prepared from polystyrene or styrene-based thermoplastics, including polystyrene homopolymer, polystyrene copolymer, and modified polystyrene, where the polystyrene is blended, grafted or copolymerized with butadiene, polybutadiene, styrene-butadiene, styrene-butadiene-styrene, styrene-isoprene-styrene, styrene-ethylene/butylene-styrene, ethylene-propylene, acrylonitrile, butadiene-acrylonitrile, a-methyl styrene, acrylic ester, methyl methacrylate, polycarbonate, or polyphenylene ether.

Preferably, the thermal insulation composition used in the present invention exhibits all the following properties at the average operating temperature of the coating:

a high compressive triaxial creep resistance at higher temperatures (<10%),
high compressive modulus (>1000 MPa),
high uniaxial compressive strength (>25 MPa),
low thermal conductivity (<0.170 W/mK),
high specific heat capacity (>1300 J/kgK),
long term temperature withstand capability (up to 100° C.),
low specific gravity (<850 kg/m$^3$),
adequate ductility (>10% elongation at break)

As mentioned above, one or more of the thermal insulation layers may also be provided with an additional protective layer, or topcoat, such as layers 7 and 9 described above, comprised of unfoamed polymeric material. Typically, but not necessarily, the protective layers are prepared from the same material as the foamed thermal insulation layer but in a solid, unfoamed state, i.e. the protective layers may preferably comprise polystyrene or styrene-based thermoplastics.

It may be required, for example, to impart a higher degree of mechanical performance, such as impact or abrasion resistance, to the outer surface of the insulated pipe, in which case it may be advantageous to prepare the outer protective topcoat from a polymeric material having superior impact or abrasion resistance to that from which the thermal insulation layer, or layers, is made. Such a material may comprise the thermal insulation material blended with suitable polymeric modifiers, compatibilisers or reinforcing fillers, or it may comprise a dissimilar polymeric material, such as an engineering thermoplastic or thermoplastic elastomer. In the latter case, it may be necessary to apply an additional adhesive layer between the thermal insulation layer and topcoat to effect adequate bonding of the two layers.

Also as mentioned above, a polymer with higher temperature resistance or softening point such as polypropylene may be used as an inner foamed or unfoamed layer closest to the hot steel pipe with a lower temperature resistant foam, comprised of polystyrene or styrene-based thermoplastic, as an outer secondary or tertiary insulation layer.

Thermal insulation compositions prepared from these materials may also contain additives selected from one or more members of the group comprising inorganic fillers, reinforcing fillers, nano-fillers, conductive fillers, flame-retardant fillers, antioxidants, heat-stabilisers, process aids, compatibilisers, and colourants.

Foaming Agents

Foamed thermal insulation layers in the insulating and protective coatings according to the invention can be prepared from the aforementioned polystyrene or styrene-based thermoplastics, by incorporating chemical foaming agents, by the physical injection of gas or volatile liquid, or by blending with hollow polymer, glass or ceramic microspheres.

The chemical foaming agents may function through either an endothermic (heat absorbing) or exothermic (heat generating) reaction mechanism, and are selected from one or more members of the group comprising sodium bicarbonate, citric acid, tartaric acid, azodicarbonamide, 4,4-oxybis (benzene sulphonyl) hydrazide, 5-phenyl tetrazole, dinitrosopentamethylene tetramine, p-toluene sulphonyl semicarbazide, or blends thereof. Preferably the chemical foaming agent is an endothermic foaming agent, such as sodium bicarbonate blended with citric or tartaric acid.

Chemical foaming occurs when the foaming agent generates a gas, usually $CO_2$ or $N_2$, through decomposition when heated to a specific temperature. The initial decomposition temperature along with gas volume, release rate and solubility are important parameters when choosing a chemical foaming agent and they need to be carefully matched to the processing temperature of the particular thermoplastic being foamed.

The gas or volatile liquid used for physical injection is selected from the group comprising $CO_2$, supercritical $CO_2$, $N_2$, air, helium, argon, aliphatic hydrocarbons, such as butanes, pentanes, hexanes and heptanes, chlorinated hydrocarbons, such as dichloromethane and trichloroethylene, and hydrochlorofluorocarbons, such as dichlorotrifluoroethane. In the case of a volatile liquid, foaming occurs when the heated liquid vaporizes into gas. Preferably the physical foaming agent is supercritical $CO_2$.

The hollow microspheres are selected from one or more members of the group comprising glass, polymeric, or ceramic, including silica and alumina, microspheres. Preferably the hollow microspheres are lime-borosilicate glass microspheres. Foamed thermal insulation layers incorporating hollow microspheres are also referred to herein as "syntactic" foams.

Thermal Insulation Application Process

The thermal insulation layer, or layers, and any unfoamed protective layers, are applied to the steel pipe or a pipeline, preferably over the corrosion protection coating, or coatings, by sidewrap or crosshead extrusion, or co-extrusion, processes.

Extrusion may be accomplished using single screw extrusion, either in single or tandem configuration, or by twin-screw extrusion methods. When extruding foamed insulation it is important that foaming be prevented until the polymer exits the extrusion die.

In the case of single screw extrusion, the extruder screw may be either a single stage or a 2-stage design. A single stage would be adequate for chemical foam extrusion whereby the foaming agent is added as a pelleted concentrate or masterbatch which is pre-mixed with the polymer to be foamed using a multi-component blender, for example, mounted over the main feed port of the extruder. In the 2-stage screw design, the first and second stages are separated by a decompression zone, at which point a gas or liquid physical foaming agent can be introduced into the polymer melt via an injection or feed port in the extruder barrel. The first stage acts to melt and homogenize the polymer, whereas the second stage acts to disperse the foaming agent, cool the melt temperature, and increase the melt pressure prior to the melt exiting the die. This may also be accomplished by tandem extrusion, wherein the two stages are effectively individual single screw extruders, the first feeding into the second. The design of the screw is important and it may incorporate barrier flights and mixing elements to ensure effective melting, mixing, and conveying of the polymer and foaming agent.

With respect to the particular foam insulations described herein, it is important that conditions of mixing, temperature and pressure are adjusted to provide a uniform foam structure comprising small or microcellular bubbles with a narrow size distribution evenly distributed within the polymer matrix in order to ensure maximum compressive strength and compressive creep resistance of the insulation when subjected to high external pressures.

Twin screw extrusion is preferred where the polymer to be foamed is shear sensitive or if it is required that fillers or other additives be incorporated into the foam composition. It is recommended for preparation of syntactic foams or foams prepared by physical injection of a gas or liquid foaming agent. Since the twin screw design is usually modular, comprising several separate and interchangeable screw elements, such as mixing and conveying elements, it offers great versatility in tailoring the screw profile for optimum mixing and melt processing. In the case of syntactic foams, for example, the hollow microspheres are fed directly into the polymer melt using a secondary twin-screw feeder downstream of the main feed hopper. Additionally, a static mixing attachment or gear pump may be inserted between the end of the screw and the die to further homogenize the melt, generate melt pressure, and minimize melt flow fluctuations.

Coating of the pipe may be accomplished using an annular crosshead die attached to the thermal insulation extruder through which the pre-heated pipe with a prior-applied corrosion protection layer or multi-layer corrosion protection system, is fed, the thermal insulation thereby covering the entire surface of the pipe by virtue of the annular die forming said thermal insulation into a tubular profile. Alternatively, the thermal insulation may be applied by a side-wrap technique whereby the thermal insulation is extruded through a flat strip or sheet die, the extruded sheet then being wrapped around the rotating pipe. It may be necessary in both cases to apply a number of wraps to achieve the required thermal insulation thickness and performance.

In the case of syntactic foams, that is foams prepared using hollow glass, polymeric or ceramic microspheres, either of these two application techniques can be used. However, in the case of blown foams, that is foams prepared using gas generated by chemical or physical means, it may be advantageous to apply the foam using the crosshead method since, a) the entire thickness may be coated in one pass, thereby negating any interfacial effects on the foam structure due to multiple wrapping, and, b) there is less orientation imparted to the extruded foam, minimizing anisotropy in the foam structure and hence non-uniform thermal and mechanical performance.

An additional consideration with syntactic foams is potential breakage of the hollow microspheres during extrusion of the foam. Shear and compressive forces inside the extruder need to be minimized during processing of the foam to prevent this through judicious design of the extruder screw(s), barrels, manifolds and dies.

If it is necessary to apply an adhesive layer between the corrosion protection layer or system, and the thermal insulation layer, or layers, this can be accomplished by utilising either a dedicated sheet or annular die for applying the adhesive prior to the foam, or a co-extrusion die, whereby the adhesive and thermal insulation layers are applied simultaneously. The outer protective topcoat, if necessary, may be similarly applied.

For a foamed thermal insulation, the degree of foaming is dependent upon the required balance of thermal conductivity and compressive strength. Too high a degree of foaming may be detrimental to the compressive strength and creep resistance of the foam. The thermoplastic foams of the present invention are typically foamed from about 50% to about 500%, more preferably 10% to 30%. The degree of foaming is defined herein as the degree of rarefaction, i.e. the decrease in density, and is defined as $[(D_{matrix}-D_{foam})/D_{matrix}]\times 100$. Expressed in this way, the degree of foaming reflects the volume percentage of gas under the assumption that the molecular weight of gas is negligible compared to that of the matrix, which is generally true. In the alternative, the degree of foaming can be measured visually by microscopic determination of cell density.

Pipe Joint Insulation System

The pipe joint insulation system referred to above comprises a polystyrene or styrene-based thermoplastic insulation layer 13, identical or similar to the composition of the thermal insulation layer, or layers, which is compatible with, and bondable to, both the corrosion protection layer or system 15 applied directly over the welded pipe joint 11 and the existing thermal insulation layer 6, or layers, on the pipe 1.

The pipe joint insulation system also comprises a corrosion protection layer 15, which may have a single or multi-layer structure. Preferably, the corrosion protection layer is similar or identical to the corrosion protection layers and systems described above in connection with FIGS. 1 to 4. For example, the corrosion protection layer 15 may comprise the epoxy and adhesive layers previously described, applied directly to the welded joint area of the steel pipe prior to the application of thermal insulation layer, or layers.

The pipe joint insulation composition may be applied either as a foam or as unfoamed solid.

The pipe joint insulation is typically applied by direct extrusion injection into a mould designed to conform to the outer dimensions of the insulated pipe. The processing conditions used will be similar to those used to apply the thermal insulation layer, or layers, of similar or identical composition.

EXAMPLES

The present invention is illustrated by way of the following examples and with references to FIGS. 1-9.

Example 1

In this example a steel pipe 1 is provided with a three layer corrosion protection coating as described above in connection with FIG. 1, comprising a corrosion protection layer 2, an adhesive layer 3 and a topcoat 4. The steel pipe 1, which was surface-blasted and cleaned, had an outside diameter of 140 mm and wall thickness of 10 mm. The pipe 1 was pre-heated to a temperature of 200° C. and spray-coated with a 0.300+/−0.100 mm thick layer 2 of fusion bonded epoxy powder (density 1400+/−100 g/l), followed immediately by the extrusion on top of the epoxy of a 0.300+/−0.200 mm layer 3 of a maleic anhydride modified ethylene copolymer adhesive (density 0.950 g/cm$^3$ and melt flow index 1.0 g/10 min.) and a 6.0+/−1.0 mm topcoat 4 of solid high impact polystyrene (density 1.183 g/cm$^3$ and melt flow index 5.0 g/10 min.) at melt temperatures of 220° C. and 200° C., respectively. Extrusion of adhesive layer 3 and topcoat 4 was accomplished in sequential fashion by extruding the material through individual sheet dies and wrapping said layers circumferentially around the rotating pipe. The 3-layer corrosion-protection coated pipe thus produced was cooled to room temperature and tested for the properties noted in Table 1.

Example 2

The corrosion-protected pipe produced in Example 1 was further coated with a 20.0+/−1.0 mm. layer 5 of the same solid high impact polystyrene of topcoat 4 using an extruder equipped with an annular crosshead die by preheating the outer surface of said corrosion-protected pipe to a temperature of around 200° C., passing the preheated pipe through said die and extruding the polystyrene at a melt temperature of 200° C. on top of the preheated outer surface. The insulated pipe thus produced was tested for the properties noted in Table 2.

Example 3

Using the coating procedure described in Example 2, the corrosion protected pipe produced in Example 1 was further coated with a 30.0+−1.0 mm layer 6 of the high impact polystyrene of Example 1 foamed to a density of 0.950 g/cm$^3$ using 0.5% by weight of an endothermic chemical foaming agent, this foamed layer being coextruded with an outer 5.0+/−1.0 mm. layer 7 of solid high impact polystyrene. The insulated pipe thus produced was tested for the properties noted in Table 2.

Example 4

Using the coating procedure of Example 2, the insulated pipe of Example 2 was further coated with a 30.0+/−1.0 mm layer 6 of the high impact polystyrene of Example 1 foamed to a density of 0.840 g/cm$^3$ using 1% by weight of an endothermic chemical foaming agent, this foamed layer being coextruded with an outer 5.0+/−1.0 mm. layer 7 of solid high impact polystyrene. The coated pipe thus produced was tested for the properties noted in Table 2.

Example 5

Using the coating procedure of Example 2, the insulated pipe of Example 3 was further coated with a 30.0+−1.0 mm layer 8 of the high impact polystyrene of Example 1 foamed to a density of 0.880 g/cm$^3$ using 0.75% by weight of an endothermic chemical foaming agent, this foamed layer being coextruded with an outer 5.0+/−1.0 mm. layer 9 of solid high impact polystyrene. The coated pipe thus produced was tested for the properties noted in Table 2.

Example 6

The corrosion protected pipe produced in Example 1, but without the high impact polystyrene topcoat, was further coated with a 20.0+/−1.0 mm layer 4 of solid polypropylene copolymer (density 0.902 g/cm$^3$ and melt flow index 0.9 g/10 min), a further 0.300+/−0.100 mm layer 5 of maleic anhydride modified ethylene copolymer adhesive, a 30.0+/−1.0 mm layer 6 of the high impact polystyrene of Example 1 foamed to a density of 0.880 g/cm$^3$ using 0.75% by weight of an endothermic chemical foaming agent, this foamed layer being coextruded with an outer 5.0+−1.0 mm. layer 7 of solid high impact polystyrene.

Example 7

The corrosion protected pipe produced in Example 1 was further coated with a 30.0+/−1.0 mm layer 6 of the high impact polystyrene of Example 1 foamed to a density of 0.950 g/cm$^3$ using 0.5% by weight of an endothermic chemical foaming agent and a 30.0+/−1.0 mm layer 8 of the high impact polystyrene of Example 1 foamed to a density of 0.880 g/cm$^3$ using 0.75% by weight of an endothermic chemical foaming agent, and outer 5.0+/−1.0 mm. layer 9 of solid high impact polystyrene modified with styrene-butadiene rubber.

Coating of all the layers in this instance was accomplished by extruding the material through individual sheet dies at a melt temperature of around 200° C. and sequentially wrapping said layers circumferentially around the rotating pipe, the outer surface of each individual layer being pre-heated to a temperature of around 200° C. immediately prior to the application of each subsequent layer in order to effect proper interlayer adhesion.

Example 8

Two 12 m lengths of pipe, corrosion protected and insulated as described in Example 3, were butt welded end-to-end, the insulating coating having been previously cut away from the steel at the end of each pipe to facilitate this process.

After welding, the bare metal of the weld area was coated with a fusion bonded epoxy corrosion protection layer 15 of approximate thickness 0.500+/−0.300 mm. The cavity between the epoxy coated weld joint and the outside diameter of the insulated pipe was then filled by injecting the high impact polystyrene of the previous examples at a temperature of about 200° C. into a circular mould conforming to the outside diameter of the insulated pipe. After cooling and removing the mould casing, the moulded field joint insulation 13 thus produced was tested for the properties noted in Table 3.

TABLE 1

| PROPERTY | TEST METHOD | EXAMPLE 1 |
|---|---|---|
| SHEAR STRENGTH (Epoxy Layer 2 to Adhesive Layer 3), MPa | Internal Method | >9 |
| SHEAR STRENGTH (Adhesive Layer 3 to Topcoat 4), MPa | Internal Method | >9 |
| CATHODIC DISBONDMENT (Epoxy Layer 2 to Steel Pipe 1), mm. | CAN/CSA-Z245.20-06 12.8 | Max. 16 mm after 28 days at 20° C. Max. 6.5 mm after 24 hours at 60° C. |

TABLE 2

| PROPERTY | TEST METHOD | EXAMPLE 2 and 4 (Insulation Layer 5) | EXAMPLE 3, 5 and 7 (Insulation Layer 6) | EXAMPLE 4 (Insulation Layer 6) | EXAMPLE 5, 6 and 7 (Insulation Layer 6, Example 6 and Insulation Layer 8, Examples 5 and 7) | EXAMPLE 6 (Insulation Layer 4) |
|---|---|---|---|---|---|---|
| Density, kg/m$^3$ | ISO 845 | 1050 | 950 | 840 | 880 | |
| THERMAL CONDUCTIVITY, W/Mk | ISO 8301 | 0.160 +/− 3% | 0.147 +/− 5% | 0.135 +/− 5% | 0.137 +/− 5% | 0.220 +/− 5% |
| UNIAXIAL COMPRESSIVE MODULUS at 2% strain, MPa | ISO 604.2 | 760 +/− 50 | 510 +/− 50 | 270 +/− 50 | 390 +/− 50 | |
| TRIAXIAL COMPRESSIVE MODULUS at 60° C., MPa | InSpec 1-1-4-140/SP01 | >1400 (Layer 5) | >1300 (Layer 6) | >500 (Layer 6) | >1200 (Layer 8) | |
| TRIAXIAL COMPRESSIVE CREEP RESISTANCE, % after 20 years at 60° C. and 5 Mpa. | InSpec 1-1-4-140/SP01 | <1.0 | <1.4% | <4.5 | <2.5 | |
| FLEXURAL MODULUS at 2% deflection, MPa | ISO 178 | 1400 | 1200 | 950 | 1100 | 700 |

TABLE 3

| PROPERTY | TEST METHOD | EXAMPLE 8 |
| --- | --- | --- |
| THERMAL CONDUCTIVITY (Insulation 13), W/mK | ISO 8301 | 0.160 +/− 3% |
| INTERFACIAL ADHESION (Insulation 13 to Insulation Layer 6), Tensile Strength, Mpa. | ISO 527-2 | >12 |
| SHEAR STRENGTH (Insulation 13 to Corrosion Protection Layer 15), MPa | Internal Method | >5 |
| CATHODIC DISBONDMENT (Corrosion Protection Layer 15 to Steel Pipe 1), mm | CAN/CSA-Z245.20-06 12.8 | Max. 16 mm after 28 days at 20° C. Max. 6.5 mm after 24 hours at 60° C. |

What is claimed is:

1. An insulated fluid or gas transport conduit for use in offshore, deep water environments, the conduit comprising:
    (a) a continuous steel pipe made up of one or more pipe sections, wherein the steel pipe has an outer surface and an inner surface; and
    (b) a thermal insulation layer provided over the outer surface of the steel pipe, wherein the thermal insulation layer is comprised of a polystyrene or styrene-based thermoplastic, having low thermal conductivity, high thermal softening point, high compressive strength and high compressive creep resistance;
    wherein the thermal insulation layer is foamed such that it contains gas bubbles, and wherein the thermal insulation layer has a degree of foaming of about 5-30 percent.

2. The insulated fluid or gas transport conduit according to claim 1 wherein the thermal insulation layer is solid.

3. The insulated fluid or gas transport conduit according to claim 1, further comprising a corrosion protection coating directly applied to the outer surface of the steel pipe and bonded thereto, and underlying the thermal insulation layer.

4. The insulated fluid or gas transport conduit according to claim 3, wherein the corrosion protection coating comprises a layer of cured epoxy.

5. The insulated fluid or gas transport conduit according to claim 1, further comprising a moulded pipe joint insulation system directly bonded to both the corrosion protection coating system and thermal insulation layer at a joint connecting two pipe sections.

6. The insulated fluid or gas transport conduit according to claim 5, wherein the moulded pipe joint insulation system is comprised of a polystyrene or styrene-based thermoplastic.

7. The insulated fluid or gas transport conduit according to claim 1, further comprising a multi-layer corrosion protection system applied to the outer surface of the steel pipe and underlying the thermal insulation layer, wherein the multi-layer corrosion protection system comprises:
    (a) a corrosion protection layer of cured epoxy directly applied to the outer surface of the steel pipe and bonded thereto; and
    (b) a first adhesive layer applied directly to the corrosion protection layer and underlying the thermal insulation layer.

8. The insulated fluid or gas transport conduit according to claim 7, wherein the thermal insulation layer is in direct contact with the first adhesive layer and is bonded thereto.

9. The insulated fluid or gas transport conduit according to claim 7, the multi-layer corrosion protection system further comprising:
    (c) a first protective topcoat comprised of an unfoamed polymeric material in direct contact with the first adhesive layer and bonded thereto, wherein the thermal insulation layer is in direct contact with the first protective topcoat and bonded thereto.

10. The insulated fluid or gas transport conduit according to claim 1, further comprising a single-layer composite corrosion protection coating directly applied to the outer surface of the steel pipe and bonded thereto and in direct contact with the thermal insulation layer, wherein the single-layer composite corrosion protection coating comprises a cured epoxy resin, an adhesive and an unfoamed polymeric material.

11. The insulated fluid or gas transport conduit according to claim 1, wherein said thermal insulation layer comprises a single layer of thermal insulation comprising said polystyrene or styrene-based thermoplastic, having low thermal conductivity, high thermal softening point, high compressive strength and high compressive creep resistance, and wherein said thermal insulation is foamed or unfoamed.

12. The insulated fluid or gas transport conduit according to claim 1, further comprising an outer protective topcoat applied over the thermal insulation layer and forming an outer surface of the pipeline, wherein the outer protective topcoat is comprised of an unfoamed polymeric material.

13. The insulated fluid or gas transport conduit according to claim 12, wherein the unfoamed polymeric material of the outer protective topcoat is comprised of a polystyrene or styrene-based thermoplastic.

14. The insulated fluid or gas transport conduit according to claim 1, wherein said thermal insulation layer comprises multiple layers of thermal insulation, at least one of said multiple layers comprising said polystyrene or styrene-based thermoplastic, having low thermal conductivity, high thermal softening point, high compressive strength and high compressive creep resistance, and being foamed or unfoamed.

15. The insulated fluid or gas transport conduit according to claim 14, wherein the multiple thermal insulation layers are all comprised of said polystyrene or styrene-based thermoplastic, having low thermal conductivity, high thermal softening point, high compressive strength and high compressive creep resistance, and being foamed or unfoamed.

16. The insulated fluid or gas transport conduit according to claim 14, wherein at least one of the multiple layers is comprised of said polystyrene or styrene-based thermoplastic, having low thermal conductivity, high thermal softening point, high compressive strength and high compressive creep resistance, and being foamed or unfoamed, and wherein at least one of the multiple layers is comprised of a dissimilar polymeric material.

17. The insulated fluid or gas transport conduit according to claim 16 wherein the dissimilar polymeric material is solid or foamed polypropylene homopolymer or copolymer.

18. The insulated fluid or gas transport conduit according to claim 14, wherein the multiple thermal insulation layers are foamed to different degrees.

19. The insulated fluid or gas transport conduit according to claim 14, wherein the multiple thermal insulation layers are separated by a layer of unfoamed polymeric material.

20. The insulated fluid or gas transport conduit according to claim 19, wherein an adhesive layer is provided between the layer of unfoamed polymeric material and one or all of the multiple thermal insulation layers.

21. The insulated fluid or gas transport conduit according to claim 19 wherein the unfoamed polymeric material is an adhesive.

22. The insulated fluid or gas transport conduit according to claim 7, wherein the adhesive layer is comprised of a polymer provided with functional groups and having a mutual affinity for the corrosion protection layer and the thermal insulation layer.

23. The insulated fluid or gas transport conduit according to claim 1, wherein the thermal insulation layer has the following properties:
- high compressive creep resistance at higher temperatures (<10%, triaxial);
- high compressive modulus (>1000 MPa);
- high compressive strength (>25 MPa, uniaxial);
- low thermal conductivity (<0.170 W/mK).

24. The insulated fluid or gas transport conduit according to claim 1, wherein the polystyrene or styrene-based thermoplastic, is selected from one or more members of the group comprising: polystyrene homopolymer, polystyrene copolymer, or modified polystyrene, where the polystyrene is blended, grafted or copolymerized with butadiene, polybutadiene, styrene-butadiene, styrene-butadiene-styrene, styrene-isoprene-styrene, styrene-ethylene/butylene-styrene, ethylene-propylene, acrylonitrile, butadiene-acrylonitrile, α-methyl styrene, acrylic ester, methyl methacrylate, polycarbonate, or polyphenylene ether.

25. The insulated fluid or gas transport conduit according to claim 1, wherein the thermal insulation layer has a density of 0.840-0.950 g/cm$^3$.

26. The insulated fluid or gas transport conduit according to claim 1, wherein the thermal insulation layer has a triaxial compressive modulus of >500 MPa at 60° C.

27. An insulated fluid or gas transport conduit for use in offshore, deep water environments, the conduit comprising:
  (a) a continuous steel pipe made up of one or more pipe sections, wherein the steel pipe has an outer surface and an inner surface; and
  (b) a thermal insulation layer provided over the outer surface of the steel pipe, wherein the thermal insulation layer is comprised of a polystyrene or styrene-based thermoplastic, having low thermal conductivity, high thermal softening point, high compressive strength and high compressive creep resistance;
  (c) a multi-layer corrosion protection system applied to the outer surface of the steel pipe and underlying the thermal insulation layer, wherein the multi-layer corrosion protection system comprises:
    (i) a corrosion protection layer of cured epoxy directly applied to the outer surface of the steel pipe and bonded thereto;
    (ii) a first adhesive layer applied directly to the corrosion protection layer and underlying the thermal insulation layer; and
    (iii) a first protective topcoat comprised of an unfoamed polymeric material in direct contact with the first adhesive layer and bonded thereto, wherein the thermal insulation layer is in direct contact with the first protective topcoat and bonded thereto.

28. The insulated fluid or gas transport conduit according to claim 27, wherein the unfoamed polymeric material of the first protective topcoat is comprised of a polystyrene homopolymer or copolymer.

29. The insulated fluid or gas transport conduit according to claim 28, wherein the unfoamed polymeric material of the first protective topcoat is comprised of high-impact polystyrene.

* * * * *

UNITED STATES PATENT AND TRADEMARK OFFICE
CERTIFICATE OF CORRECTION

| | | |
|---|---|---|
| PATENT NO. | : 8,714,206 B2 | Page 1 of 1 |
| APPLICATION NO. | : 11/962772 | |
| DATED | : May 6, 2014 | |
| INVENTOR(S) | : Jackson et al. | |

It is certified that error appears in the above-identified patent and that said Letters Patent is hereby corrected as shown below:

In the specification:

In Column 10, Lines 58-59, delete "50% to about 500%" and replace with -- 5% to about 50% --

In Column 12, Line 11, delete "30.0+-1.0" and replace with -- 30.0+/- 1.0 --

In Column 12, Line 34, delete "30.0+-1.0" and replace with -- 30.0+/- 1.0 --

In Column 12, Line 53, delete "5.0+-1.0" and replace with -- 5.0+/- 1.0 --

Signed and Sealed this
Fifth Day of January, 2016

Michelle K. Lee
*Director of the United States Patent and Trademark Office*